United States Patent [19]

Roley et al.

[11] 4,089,531

[45] May 16, 1978

[54] CRESCENT SEAL WITH REINFORCING RING

[75] Inventors: Robert D. Roley, Peoria; James R. Sturges, Washington, both of Ill.

[73] Assignee: Caterpillar Tractor Co., Peoria, Ill.

[21] Appl. No.: 829,685

[22] Filed: Sep. 1, 1977

[51] Int. Cl.² .............................................. F16J 15/38
[52] U.S. Cl. ......................................... 277/92; 277/95; 277/164; 277/165; 277/206 R; 277/231; 277/235 R; 305/11
[58] Field of Search .................. 305/11, 58 R, 58 PC; 277/92, 95, 164, 165, 206 R, 231, 235 R

[56] References Cited

U.S. PATENT DOCUMENTS

| 3,110,097 | 11/1963 | Yocum | 305/11 X |
|---|---|---|---|
| 3,480,338 | 11/1969 | Durham et al. | 305/11 |
| 3,554,567 | 1/1971 | Carroll et al. | 277/164 |
| 3,614,113 | 10/1971 | Burk | 305/11 X |
| 3,622,165 | 11/1971 | Hatch | 305/11 X |
| 3,841,718 | 10/1974 | Reinsma | 277/164 X |

Primary Examiner—Robert S. Ward, Jr.
Attorney, Agent, or Firm—Phillips, Moore, Weissenberger, Lempio & Majestic

[57] ABSTRACT

An endless track assembly comprises a plurality of pivotally interconnected links with each pair of adjacent links having an annular seal assembly mounted therebetween. The seal assembly comprises an elastomeric crescent-shaped seal having a lip disposed in sealing contact with a sealing surface defined in the track assembly. An annular elastomeric load ring is disposed within the seal to urge the lip into such sealing contact. A metallic reinforcing ring, disposed between the lip and the load ring, is preferably bonded only to the lip.

12 Claims, 3 Drawing Figures

CRESCENT SEAL WITH REINFORCING RING

BACKGROUND OF THE INVENTION

Endless track assemblies for track-type tractors and the like comprise a plurality of track shoes pivotally interconnected together by a link assembly. The link assembly comprises a plurality of pivotally interconnected links with each pair of adjacent links having an annular elastomeric seal assembly disposed therebetween. Elastomeric seal assemblies of this type are normally sensitive to "end play" and do not always assure efficient sealing over the maximum range of seal travel upon relative pivoting of the adjacent pair of track links.

SUMMARY OF THIS INVENTION

The present invention is directed to overcoming one or more of the problems as set forth above.

The seal assembly of this invention, adapted to be mounted between an adjacent pair of track links, comprises a crescent-shaped elastomeric seal, an annular elastomeric load ring disposed within the seal to urge a lip thereof into sealing contact with a sealing surface defined in the track assembly and an annular reinforcing ring disposed between the lip and the load ring. The ring functions to maintain the lip in intimate sealing contact with the sealing surface defined in the track assembly upon relative pivoting of the adjacent pair of track links.

BRIEF DESCRIPTION OF THE DRAWING

Other objects of this invention will become apparent from the following description and accompanying drawing wherein.

DETAILED DESCRIPTION

Figure 1:
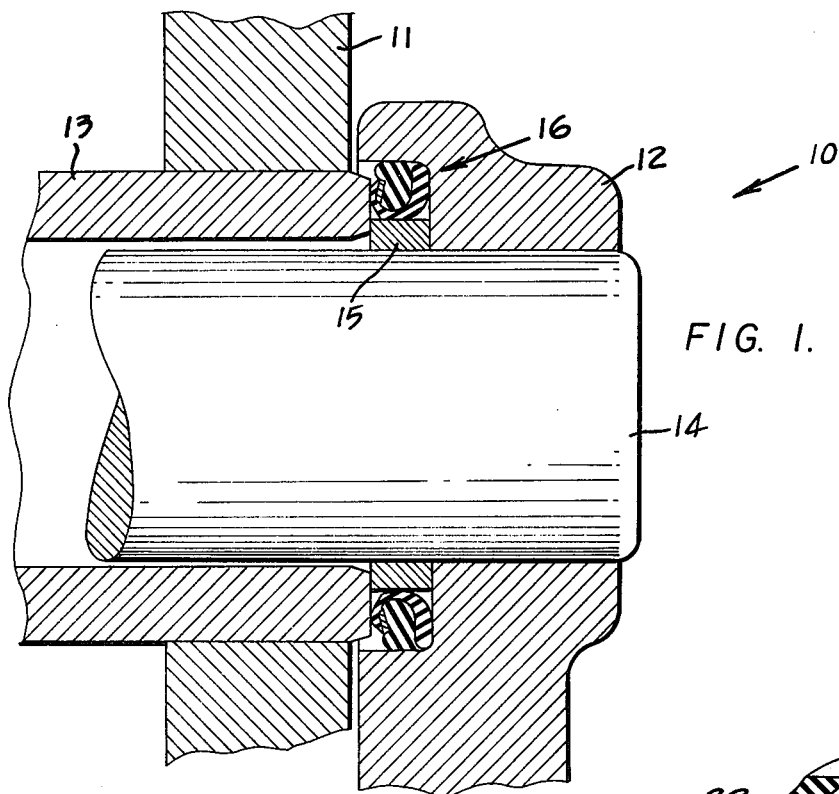
FIG. 1 is a sectional view partially illustrating a hinge joint of a track assembly having the seal assembly of this invention mounted therein.

FIG. 1 partially illustrates an endless track assembly 10 of a track-type vehicle, such as a tractor, comprising a plurality of pivotally interconnected inner and outer track links 11 and 12, respectively. The track links form a hinge joint comprising a cylindrical bushing 13 secured to inner link 11 and a pin 14 secured to outer link 12 in a conventional manner. A metallic spacer ring 15 is secured on the pin and is disposed between outer link 12 and bushing 13.

A seal assembly 16 of this invention is disposed within a counterbore defined on an inboard side of outer link 12 and circumvents ring 15. As more clearly shown in FIGS. 2 and 3, the seal assembly comprises an annular elastomeric seal 17 having a crescent-shaped cross section defining an annular groove 18 therein and an annular elastomeric load ring 19 disposed within the groove. The seal and load ring may be constructed and arranged substantially in accordance with the teachings set forth in U.S. Pat. No. 3,841,718, assigned to the assignee of this application.

Seal 17 has a sealing lip 20 formed thereon which is disposed in intimate sealing contact with a sealing surface 21, defined on an outer end of bushing 13. An annular reinforcing ring 22 is disposed between lip 20 and an inboard side of load ring 19. Reinforcing ring 22 is preferably bonded or otherwise suitably adhesively secured to lip 20, but is not secured to load ring 19 to permit relative sliding therebetween.

The reinforcing ring is preferably composed of a metallic material, such as steel, which has a modulus of elasticity substantially greater than that of elastomeric seal 17 (e.g., approximately one-thousand times that of the material composing the seal). It should be further noted that the reinforcing ring is frusto-conically shaped and is disposed at an angle $a$, relative to radially disposed sealing surface 21, which may be selected from the range of from 5° to 15° and closely approximates 10° in FIG. 2.

Figure 3:
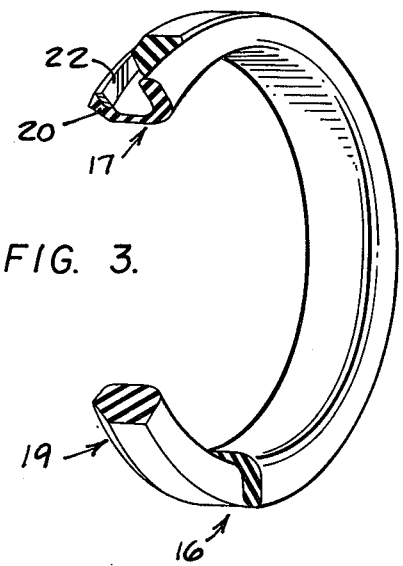
FIG. 3 is a partially sectioned isometric view of the seal assembly as it would appear in its relaxed state, prior to its installation in the hinge joint.
Figure 2:
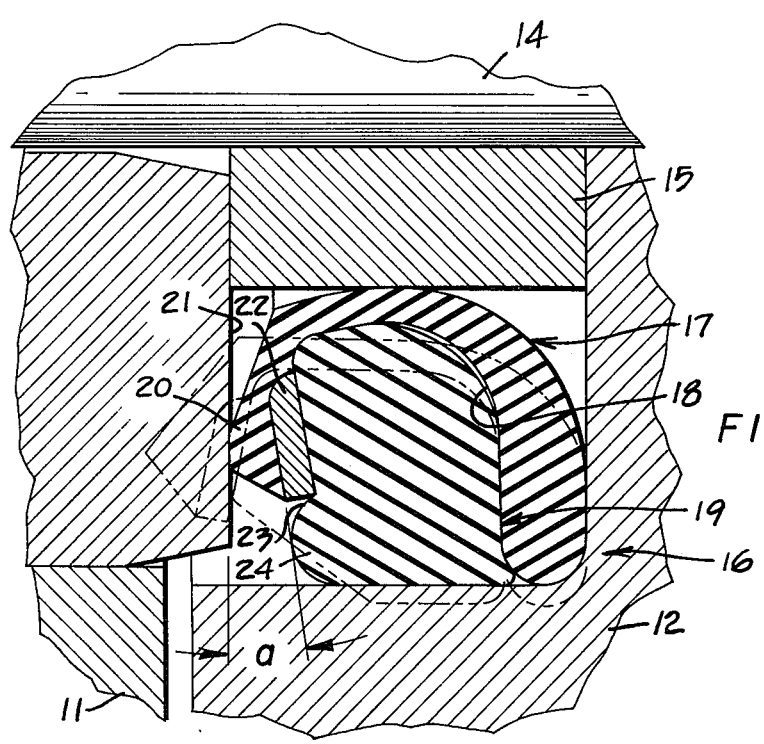
FIG. 2 is an enlarged sectional view of the seal assembly mounted in the hinge joint.

The pre-installed and expanded condition of seal assembly 16 is illustrated in FIG. 3 and also by phantom lines in FIG. 2. Upon installation, lip 20 is compressed in an axial direction to assume the sealing condition illustrated by full lines in FIG. 2 wherein a lower edge of reinforcing ring 22 is depressed within a recess 23, defined by an annular bulge 24 formed on load ring 19. In operation and upon relative pivotal movements of track links 11 and 12, the load ring will function to maintain lip 20 in intimate sealing contact with sealing surface 21 to stabilize the lip to provide sealing capabilities over a substantial range of seal travel.

The embodiments of the invention in which an exclusive property or privilege is claimed are defined as follows:

1. In a track assembly of the type comprising a plurality of pivotally interconnected links and annular sealing means disposed between each adjacent pair of links, the improvement wherein said sealing means comprises an annular elastomeric seal having a crescent-shaped cross section defining an annular groove therein and a lip disposed in sealing contact with a sealing surface defined in said track assembly, an annular elastomeric load ring disposed within the annular groove defined in said seal for urging said lip into sealing contact with said sealing surface and annular reinforcing ring means disposed between the lip of said seal and said load ring for maintaining said lip in intimate sealing contact with said sealing surface upon relative pivoting of said pair of said links.

2. The track assembly of claim 1 wherein said reinforcing ring means is secured to the lip of said seal, but is disposed in unsecured relationship relative to said load ring.

3. The track assembly of claim 1 wherein said track assembly further comprises a bushing secured to an inner link of said pair of links and a pin secured to an outer link of said pair of links and wherein said sealing surface is defined on an outer end of said bushing.

4. The track assembly of claim 1 wherein said reinforcing ring means is metallic and has a modulus of elasticity substantially greater than that of said seal.

5. The track assembly of claim 1 wherein said reinforcing ring means is frusto-conically shaped.

6. The track assembly of claim 5 wherein said reinforcing ring, when viewed in cross section, is disposed at an acute angle relative to said sealing surface selected from the range of from 5° to 15°.

7. The track assembly of claim 6 wherein said angle approximates 10°.

8. The track assembly of claim 1 wherein an outer edge of said reinforcing ring means is disposed in an annular recess defined by an annular bulge formed on said load ring.

9. A seal assembly adapted for use in endless track assemblies and the like comprising an annular elastomeric seal having a crescent-shaped cross section defining an annular groove therein and an annular lip, an annular elastomeric load ring disposed within the annular groove defined in said seal adapted to urge said lip outwardly into sealing contact and annular reinforcing ring means disposed between the lip of said seal and said load ring adapted to maintain said lip in said sealing contact.

10. The track assembly of claim 9 wherein said reinforcing ring means is secured to the lip of said seal, but is disposed in unsecured relationship relative to said load ring.

11. The track assembly of claim 9 wherein said reinforcing ring means is metallic and has a modulus of elasticity substantially greater than that of said seal.

12. The track assembly of claim 9 wherein said reinforcing ring means is frusto-conically shaped.

* * * * *